United States Patent
Severyn et al.

(10) Patent No.: US 12,409,684 B2
(45) Date of Patent: Sep. 9, 2025

(54) BI-DIRECTIONAL SIPE AND/OR SLOT

(71) Applicant: BRIDGESTONE AMERICAS TIRE OPERATIONS, LLC, Nashville, TN (US)

(72) Inventors: David M. Severyn, North Canton, OH (US); Paul J. Wischt, Jr., Barberton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/701,776

(22) PCT Filed: Oct. 7, 2022

(86) PCT No.: PCT/US2022/077735
§ 371 (c)(1),
(2) Date: Apr. 16, 2024

(87) PCT Pub. No.: WO2023/064705
PCT Pub. Date: Apr. 2, 2023

(65) Prior Publication Data
US 2024/0424836 A1     Dec. 26, 2024

Related U.S. Application Data

(60) Provisional application No. 63/256,543, filed on Oct. 16, 2021.

(51) Int. Cl.
*B60C 11/12* (2006.01)
(52) U.S. Cl.
CPC ...... *B60C 11/1281* (2013.01); *B60C 11/1263* (2013.01); *B60C 2011/1209* (2013.01)
(58) Field of Classification Search
CPC .............. B60C 11/1263; B60C 11/1281; B60C 11/1392
See application file for complete search history.

(56) References Cited

U.S. PATENT DOCUMENTS

2001/0022209 A1\* 9/2001 Chaen ..................... B60C 11/12
152/151
2012/0227883 A1   9/2012 Audigier et al.
(Continued)

FOREIGN PATENT DOCUMENTS

JP     2004330812 A       11/2004
KR    100869025 B1 \*    11/2008
(Continued)

OTHER PUBLICATIONS

English machine translation of WO2012093000. (Year: 2012).\*
(Continued)

*Primary Examiner* — Robert C Dye
(74) *Attorney, Agent, or Firm* — Matthew Jupina; Ty Kendrick

(57) ABSTRACT

In one aspect, a tire is provided, comprising: a tread portion comprising a tread rib or a tread block, a sipe included in tread rib or the tread block, wherein the sipe includes a center section located axially between opposing outer sections, and wherein the center section and each outer section include a radially outer portion and a radially inner portion, wherein the radially outer portion of each outer section has a circumferential width WT1, wherein the radially outer portion of the center section has a circumferential width WT2, wherein the circumferential width WT1 is greater than the circumferential with WT2, wherein the radially inner portion of each outer section includes an axially outer portion having a radial depth DB1E and an axially inner portion having a radial depth DB1I, and wherein the radial depth DB1E is less than the radial depth DB1I.

17 Claims, 6 Drawing Sheets

(56) References Cited

U.S. PATENT DOCUMENTS

| | | |
|---|---|---|
| 2018/0162171 A1* | 6/2018 | Colletti .............. B60C 11/0306 |
| 2019/0176528 A1 | 6/2019 | Ito |
| 2019/0193475 A1* | 6/2019 | Shiraishi ............ B60C 11/0304 |
| 2019/0359002 A1 | 11/2019 | Hirosue |
| 2020/0180363 A1 | 6/2020 | Zivkovic |

FOREIGN PATENT DOCUMENTS

| | | | | |
|---|---|---|---|---|
| WO | WO-2012093000 A1 * | 7/2012 | ......... | B60C 11/0306 |
| WO | 2013002801 A1 | 1/2013 | | |

OTHER PUBLICATIONS

International Search Report and Written Opinion issued in PCT/US22/77735, dated Jan. 20, 2023 (9 pages).
International Preliminary Report on Patentability issued in PCT/US22/77735, dated Apr. 16, 2024 (7 pages).
Thanbichler, Peter, Extended European Search Report issued Aug. 5, 2025 in European Patent Application No. 22881920.7, 8 pp.

* cited by examiner

BI-DIRECTIONAL SIPE AND/OR SLOT

CROSS-REFERENCE TO RELATED APPLICATIONS

This application claims priority from U.S. Provisional Patent Application No. 63/256,543, filed on Oct. 16, 2021, which is incorporated by reference herein in its entirety.

BACKGROUND

Tires are often designed to optimize performance in a variety of road conditions. For example, an all-weather tire may include tread features that are designed to optimize performance in dry road conditions, wet road conditions, and snow-covered/icy road conditions.

Obtaining traction in snow and ice is often achieved by providing "biting edges" in the tread of the tire. These "biting edges" are often in the form of sipes or slots. However, too many sipes or slots can lead to a loss of tread block or rib stiffness, which may be undesirable in the performance optimization of the tire, particularly in dry roadway conditions.

Accordingly, what is needed is a tire tread feature to balance snow and ice traction with dry roadway traction.

SUMMARY

In one aspect, a tire is provided, the tire comprising: a tread portion comprising at least one of a tread rib or a tread block, a sipe included in the tread rib or the tread block, wherein the sipe includes a center section located axially between opposing outer sections, and wherein the center section and each outer section include a radially outer portion and a radially inner portion, wherein the radially outer portion of each outer section has a circumferential width WT1, wherein the radially outer portion of the center section has a circumferential width WT2, wherein the circumferential width WT1 is greater than the circumferential with WT2, wherein the radially inner portion of each outer section includes an axially outer portion having a radial depth DB1E and an axially inner portion having a radial depth DB1I, and wherein the radial depth DB1E is less than the radial depth DB1I.

In another aspect, a tire is provided, the tire comprising: a tread portion comprising at least one of a tread rib or a tread block, a sipe included in the tread rib or the tread block, wherein the sipe includes a center section located axially between opposing outer sections, and wherein the center section and each outer section include a radially outer portion and a radially inner portion, wherein the radially outer portion of each outer section has a circumferential width WT1, wherein the radially outer portion of the center section has a circumferential width WT2, wherein the circumferential width WT1 is greater than the circumferential width WT2, wherein the radially inner portion of each outer section has a circumferential width WB1 that is less than the width WT1, wherein the radially inner portion of the center section has a circumferential width WB2 that is greater than the width WT2, and wherein the circumferential width WB1 is less than the circumferential width WB2, and wherein the width WB2 is less than the width WT1.

In another aspect, a tire sipe blade is provided, the tire sipe blade comprising: a center section located axially between opposing outer sections, wherein the center section and each outer section include a radially outer portion and a radially inner portion, wherein the radially outer portion of each outer section has a circumferential width WT1, wherein the radially outer portion of the center section has a circumferential width WT2, wherein the circumferential width WT1 is greater than the circumferential with WT2, wherein the radially inner portion of each outer section includes an axially outer portion having a radial depth DB1E and an axially inner portion having a radial depth DB1I, and wherein the radial depth DB1E is less than the radial depth DB1I.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

DETAILED DESCRIPTION

Figure 1A:
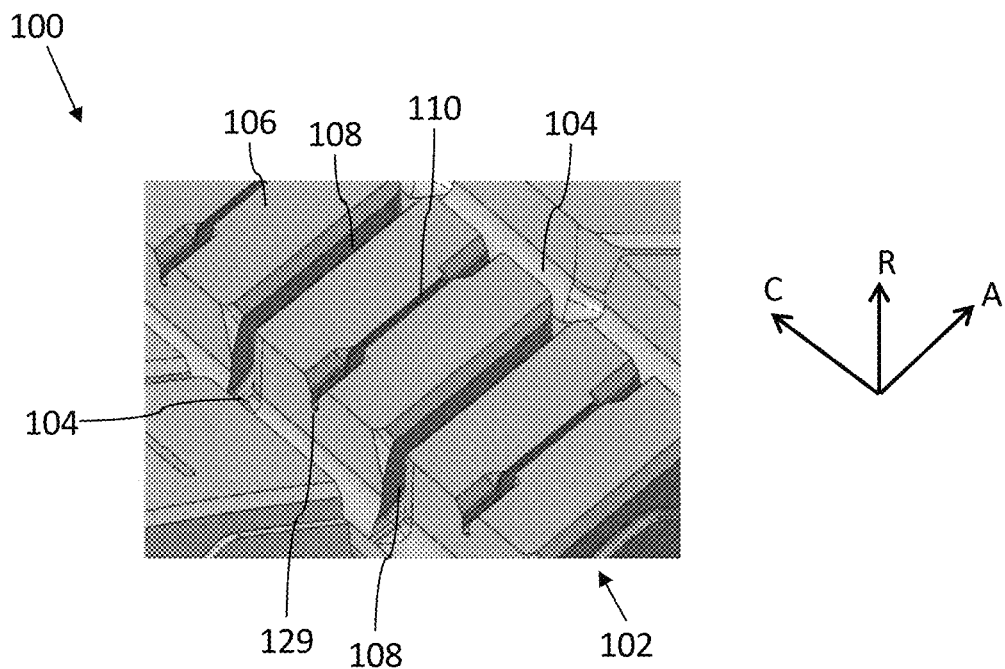
FIG. 1A illustrates a perspective view of a tire tread 100 having a tread block 106 with a bi-directional sipe and/or slot 110.
Figure 1B:
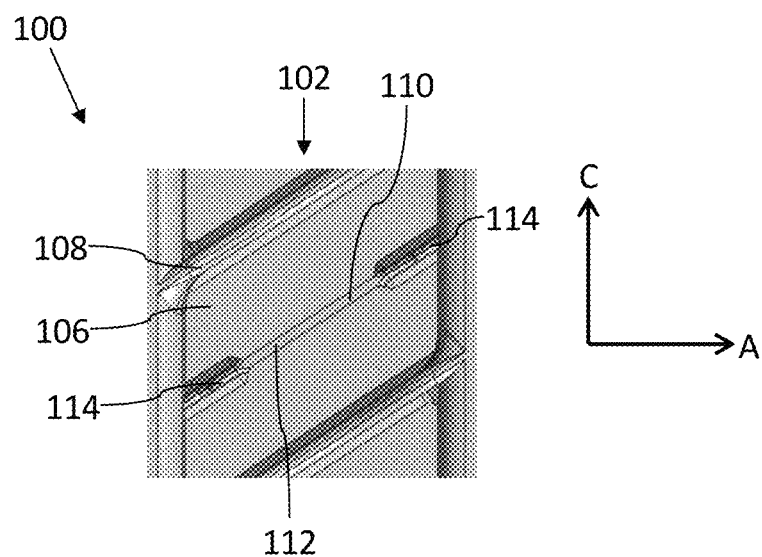
FIG. 1B illustrates a plan view of tire tread 100 having tread block 106 with bi-directional sipe and/or slot 110.
Figure 1C:
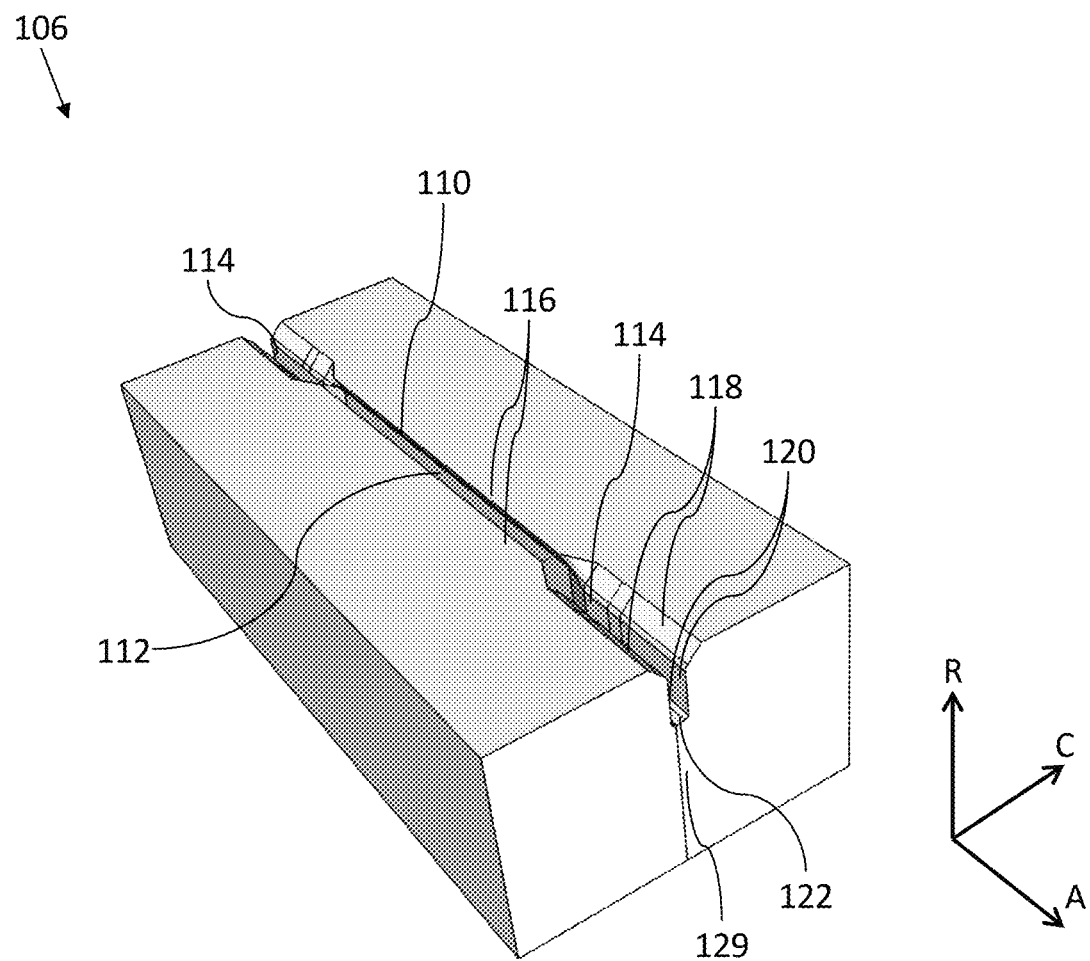
FIG. 1C illustrates a perspective view of tread block 106 with a bi-directional sipe and/or slot 110.
Figure 1D:
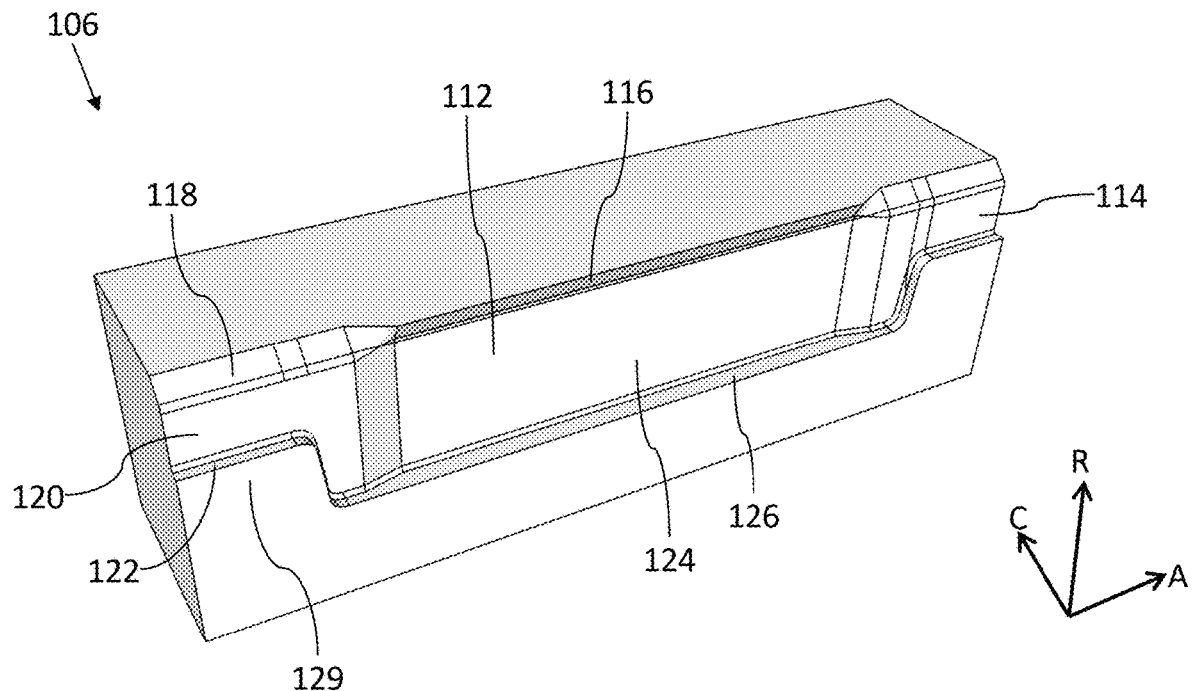
FIG. 1D illustrates a perspective view of half of tread block 106 with a bi-directional sipe and/or slot 110.
Figure 1E:
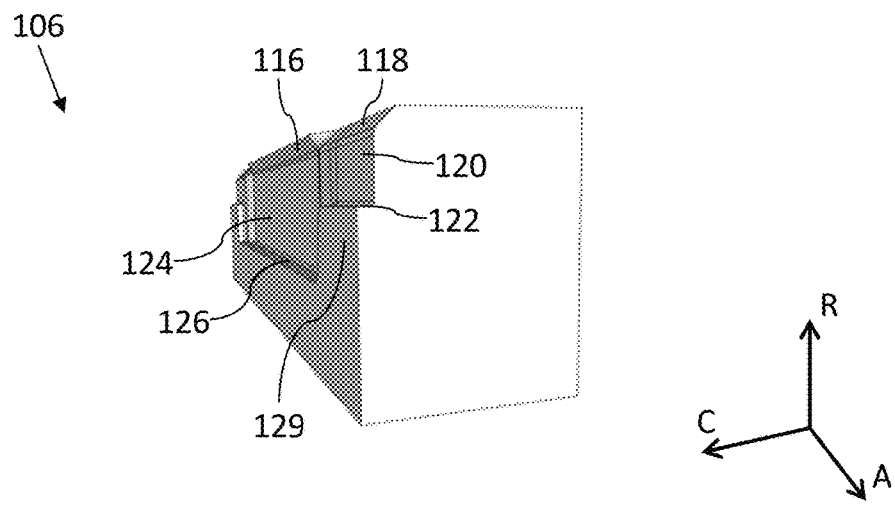
FIG. 1E illustrates a perspective view of half of tread block 106 with a bi-directional sipe and/or slot 110.

FIGS. 1A-1E illustrate a tire tread 100 having a tread block 106 with a bi-directional sipe and/or slot 110. Tire tread 100 may be utilized on any of a variety of tires, including for example tires intended for use in both dry running surfaces and snow and ice-covered running surfaces.

Axes and planes described herein are illustrated in FIGS. 1A-1E, and include a circumferential axis C oriented in the circumferential direction of the tire, a radial axis R oriented in the radial direction of the tire, and an axial axis A oriented in the axial direction of the tire.

Tire tread 100 may include at least one block row 102 defined by parallel circumferential grooves 104. Axial slots/sipes 108 may extend at least partially across block row 102 to define individual tread blocks 106. At least one tread block 106 includes a bi-directional sipe and/or slot 110. Alternatively, tire tread 100 may include at least tread rib in lieu or tread blocks, and the tread rib includes a bi-directional sipe and/or slot 110.

Sipe/slot 110 includes a center section 112 located between (e.g., axially between) opposing outer sections 114.

Sipe/slot 110 includes opposing key edges 116 limited to center section 112. Key edges 116 are a negative, or undercut angle with respect to the radial direction R at the radially outer surface, which results in block 106 having opposing, inwardly-facing acute angles at the radially outer portion.

Opposing key edges 116 result in a bi-directional (that is, the tire is not required to have a specific direction of rolling) that result in increased snow and ice traction. The bi-directional nature of opposing key edges 116 allows the tire to function as intended regardless of the rolling direction of the tire, such that an installer can mount the tire on the vehicle with the tread rolling either direction without tire performance degradation. Additionally, the bi-directional nature of opposing key edges 116 may provide a benefit in snow and ice traction both when the tire is accelerating and braking. That is, the acute angle key edge 116 "bites" into snow and ice surfaces to increase traction of the tire on those surfaces. The shape of key edge 116 is most easily viewed in FIG. 1E.

Sipe/slot 110 includes opposing chamfered edges 118 limited to outer sections 114. Chamfered edges 118 are a positive angle with respect to the radial direction R at the radial outer surface. That is, chamfered edge 118 are angled in the opposite direction as key edges 116. The shape of chamfered edge 118 is most easily viewed in FIG. 1E.

Outer section opposing sidewalls 120 extend substantially in the radial direction R radially inwardly from chamfered edges 118 to an outer base 122. Center section opposing sidewalls 124 extend substantially in the radial direction R radially inwardly from key edges 116 to a center base 126.

Outer sections 114 may include a step resulting from a shorter radial depth (D1E described below) at an outermost, exterior portion, and a longer radial depth (D1I described below) at an innermost, interior portion. The result is the formation of tie bars 129 within sipe/slot 110. Tie bars 129 may act to "tie" together the two halves of block 106 that is bisected by sipe/slot 110, resulting in increased stiffness in block 106.

The relative dimensions and angles of sipe/slot 110 are outlined below with respect to the sipe blade 230.

FIGS. 2A-2F illustrate a tire sipe/slot blade 230 for forming a bi-directional sipe and/or slot, such as sipe/slot 110.

Blade 230 includes a center section 232 located between (e.g., axially between) opposing outer sections 234. Center section 232 includes a top center section surface 235 and each outer section 234 includes a top outer section surface 237.

Blade 230 includes opposing key forming edges 236 limited to center section 232. Key forming edges 236 form negative, or undercut angle (key edges 116) with respect to the radial direction R at the radially outer surface of tire tread 100, which results in block 106 having opposing, inwardly-facing acute angles (key edges 116) at the radially outer portion. The shape of key forming edge 236 is most easily viewed in FIGS. 2A and 2C-2E.

Blade 230 includes opposing chamfered forming edges 238 limited to outer sections 234. Chamfered forming edges 238 form a positive angle with respect to the radial direction R at the radial outer surface. That is, chamfered forming edge 238 are angled in the opposite direction as key forming edges 236. The shape of chamfered forming edge 238 is most easily viewed in FIGS. 2A and 2C-2E.

Outer sections 234 include outer section opposing sidewalls 240 that form sidewalls 120. Sidewalls 240 extend downward from chamfered forming edges 238. Center section 232 includes center section opposing sidewalls 244 that form sidewalls 124. Sidewalls 244 extend downward from key forming edges 236.

Top outer section surface 237 includes a width (e.g., circumferential width) WT1. In one aspect, width WT1 is between about 1.0 mm and about 3.0 mm. In another aspect, width WT1 is between 1.0 mm and 3.0 mm. In another aspect, width WT1 is between about 1.5 mm and about 2.5 mm. In another aspect, width WT1 is between 1.5 mm and 2.5 mm. In another aspect, width WT1 is between about 1.75 mm and about 2.25 mm. In another aspect, width WT1 is between 1.75 mm and 2.25 mm. In another aspect, width WT1 is about 2.0 mm. In another aspect, width WT1 is 2.0 mm.

Top center section surface 235 includes a width (e.g., circumferential width) WT2. In one aspect, width WT2 is between about 0.5 mm and about 2.0 mm. In another aspect, width WT2 is between 0.5 mm and 2.0 mm. In another aspect, width WT2 is between about 0.7 mm and about 1.8 mm. In another aspect, width WT2 is between 0.7 mm and 1.8 mm. In another aspect, width WT2 is between about 0.8 mm and about 1.5 mm. In another aspect, width WT2 is between 0.8 mm and 1.5 mm. In another aspect, width WT2 is about 1.0 mm. In another aspect, width WT2 is 1.0 mm.

Width WT1 is greater than width WT2. In one aspect, width WT1 is about 2.0 times the value of width WT2. In another aspect, width WT1 is 2.0 times the value of width WT2. In another aspect, width WT1 is between 1.5 and 2.5 times the value of width WT2.

Sidewalls 240 are separated by a width (e.g., circumferentially) WB1.

Sidewalls 244 are separated by a width (e.g., circumferentially) WB1.

Width WB1 is less than width WT1. Width WB2 is greater than width WT2. Width WB1 is less than width WB2. In one aspect, width WB1 and width WB2 are both less than width WT1.

In one aspect, width WB1 is equal to width WT2. In another aspect, width WB2 is equal to width WT1.

Each of outer sections 234 may include a length (e.g., axially) L1.

Each of outer sections 234 may include an outermost exterior portion having a shorter radial depth (D1E) and a length (e.g., axially) L1E, and an interior portion having a longer radial depth (D1I) and a length L1I. Length L1 is equal to length L1E plus length L1I.

Figure 2A:
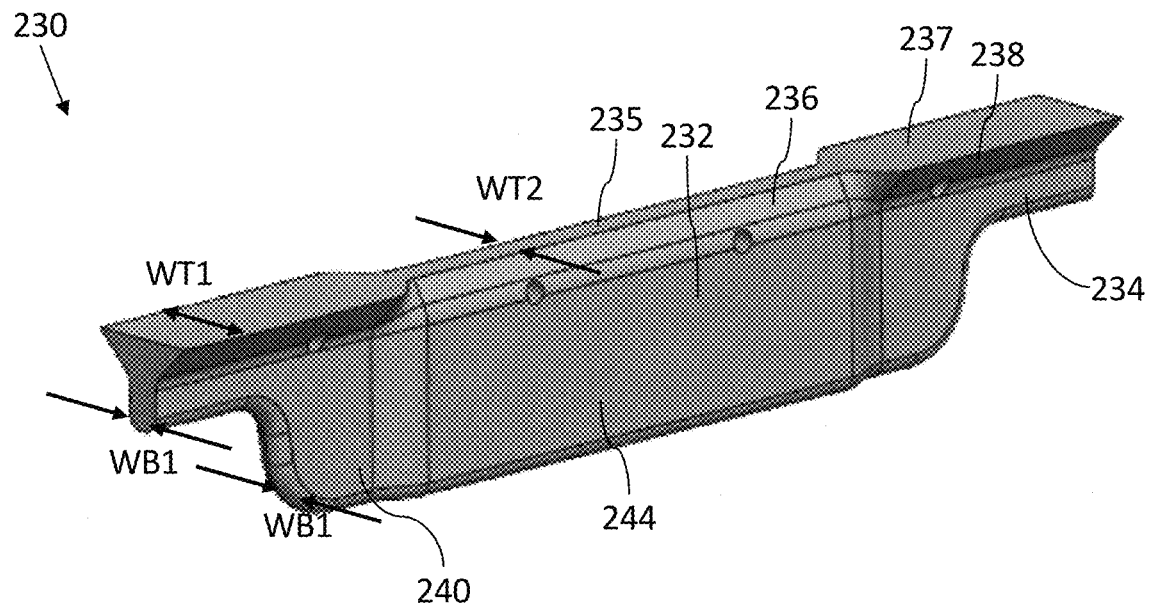
FIG. 2A illustrates a perspective view of a tire sipe blade 230 for forming a bi-directional sipe and/or slot.
Figure 2B:
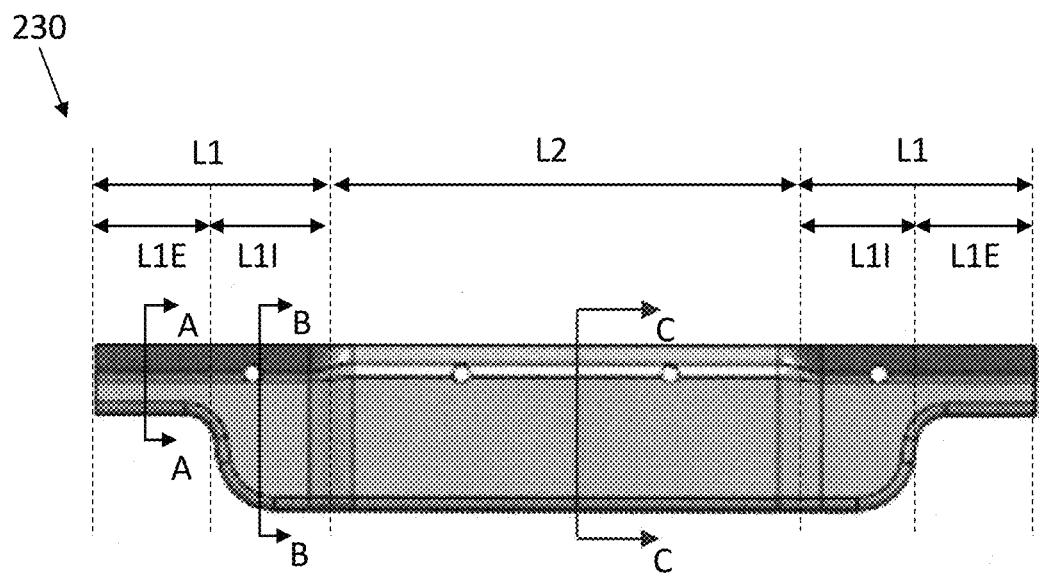
FIG. 2B illustrates an elevation view of tire sipe blade 230 for forming a bi-directional sipe and/or slot.
Figures 2C, 2D, 2E:
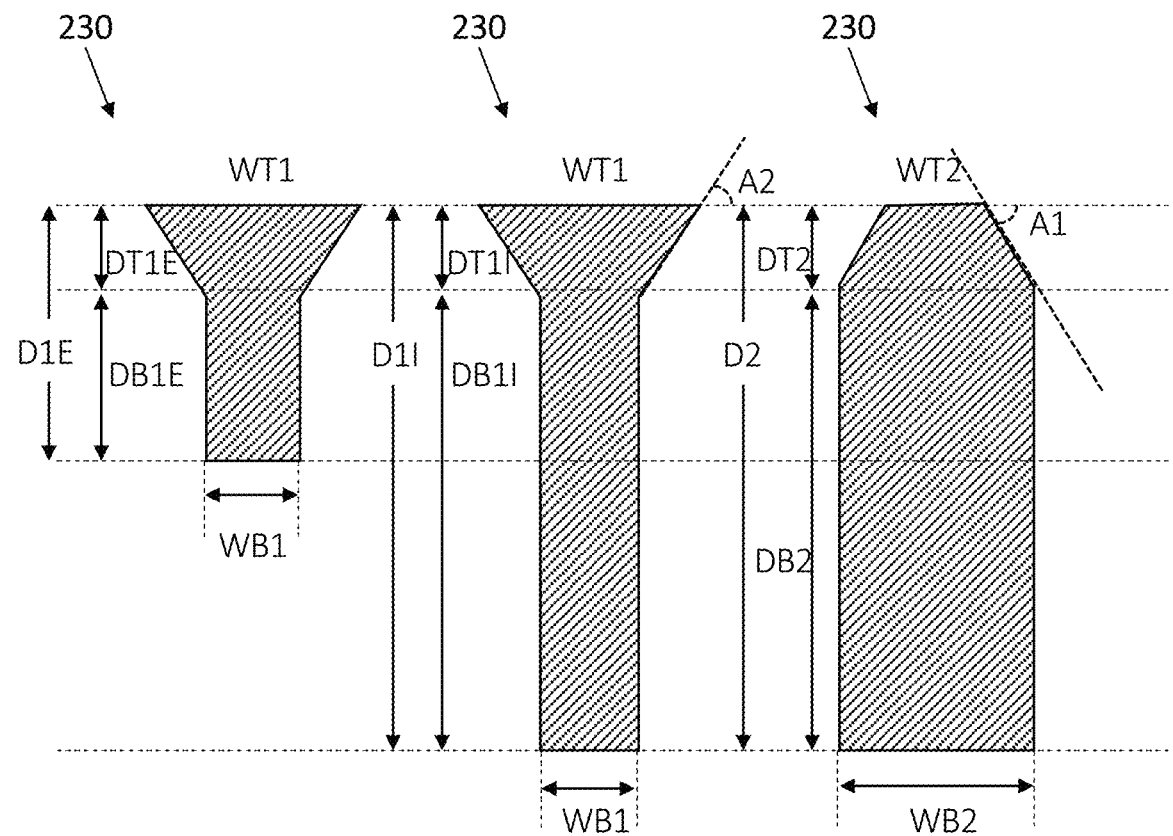
FIG. 2C illustrates a cross-sectional view of a tire sipe blade 230 taken about a plane formed by reference line A-A in FIG. 2B.
FIG. 2D illustrates a cross-sectional view of a tire sipe blade 230 taken about a plane formed by reference line B-B in FIG. 2B.
FIG. 2E illustrates a cross-sectional view of a tire sipe blade 230 taken about a plane formed by reference line C-C in FIG. 2B.
Figure 2F:
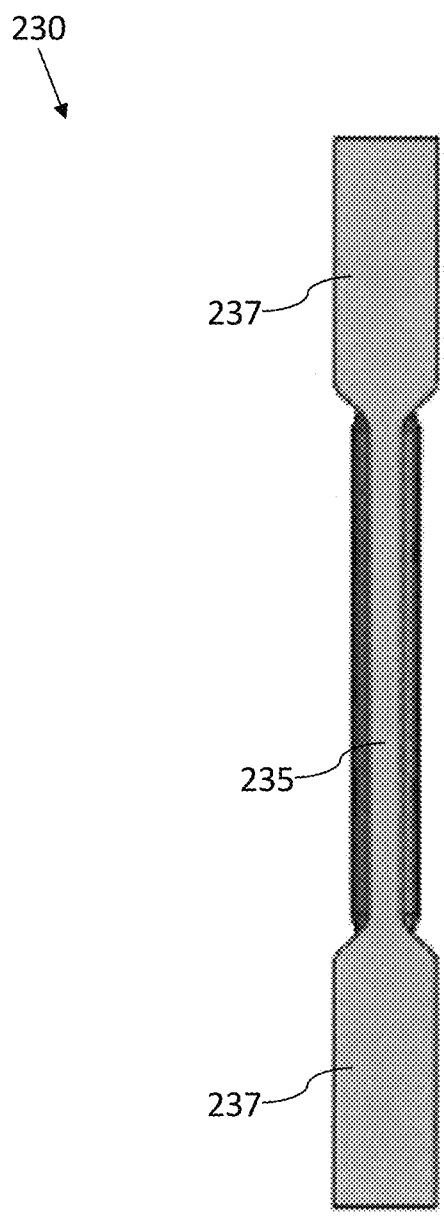
FIG. 2F illustrates a plan view of tire sipe blade 230 for forming a bi-directional sipe and/or slot.

FIG. 2C illustrates a cross-sectional view of a tire sipe blade 230 taken about a plane formed by reference line A-A in FIG. 2B. FIG. 2D illustrates a cross-sectional view of a tire sipe blade 230 taken about a plane formed by reference line B-B in FIG. 2B. FIG. 2E illustrates a cross-sectional view of a tire sipe blade 230 taken about a plane formed by reference line C-C in FIG. 2B.

Outermost exterior portion of each outer section 234 may include a total radial depth D1E, with chamfered forming edges 238 having a radial depth DT1E and sidewalls 240 having a radial depth DB1E. Depth D1E is equal to depth DT1E plus depth DB1E.

Interior portion of each outer section 234 may include a total radial depth D1I, with chamfered forming edges 238 having a radial depth DT1I and sidewalls 240 having a radial depth DB1I. Depth D1I is equal to depth DT1I plus depth DB1I.

In one aspect, radial depth DB1E is less than radial depth DB1I. In one aspect, radial depth DT1E is equal to radial depth DT1I. In another aspect, radial depths DT1E, DT1I, and DT2 are all equal to one another.

Center section 232 may include a total radial depth D2, with key forming edges 236 having a radial depth DT2 and sidewalls 244 having a radial depth DB2. Depth D2 is equal to depth DT2 plus depth DB2.

In one aspect, radial depth DB2 is greater than radial depth DB1E. In another aspect, depth DB2 is equal to depth DB1I. In another aspect, depth D2 is equal to depth D1. In another aspect, depth DT2 is equal to depth DT1I.

Center section 232 may include a length (e.g., axially) L2.

Key forming edges 236 include an angle A1 relative to the axial direction. In one aspect, angle A1 is between about 45 degrees and about 75 degrees. In another aspect, angle A1 is between 45 degrees and 75 degrees. In another aspect, angle A1 is between about 50 degrees and about 70 degrees. In another aspect, angle A1 is between 50 degrees and 70 degrees. In another aspect, angle A1 is between about 55 degrees and about 65 degrees. In another aspect, angle A1 is between 55 degrees and 65 degrees. In another aspect, angle A1 is about 60 degrees. In another aspect, angle A1 is 60 degrees.

Chamfered forming edges 238 include an angle A2 relative to the axial direction. In one aspect, angle A2 is between about 45 degrees and about 75 degrees. In another aspect, angle A2 is between 45 degrees and 75 degrees. In another aspect, angle A2 is between about 50 degrees and about 70 degrees. In another aspect, angle A2 is between 50 degrees and 70 degrees. In another aspect, angle A2 is between about 55 degrees and about 65 degrees. In another aspect, angle A2 is between 55 degrees and 65 degrees. In another aspect, angle A2 is about 60 degrees. In another aspect, angle A2 is 60 degrees.

Angle A1 may be equal to angle A2, with each being relative to the axial direction A, but one being positive and the other being negative.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire comprising:
   a tread portion comprising at least one of a tread rib or a tread block,
   a sipe included in the tread rib or the tread block,
   wherein the sipe includes a center section located axially between opposing outer sections, and wherein the center section and each outer section include a radially outer portion and a radially inner portion,
   wherein the radially outer portion of each outer section has a circumferential width WT1,
   wherein the radially outer portion of the center section has a circumferential width WT2,
   wherein the circumferential width WT1 is greater than the circumferential with WT2,
   wherein the radially inner portion of each outer section includes an axially outer portion having a radial depth DB1E and an axially inner portion having a radial depth DB1I,
   wherein the radial depth DB1E is less than the radial depth DB1I; and
   wherein the sipe center section has opposing key edges on its radially outer portion.

2. The tire of claim 1, wherein the opposing key edges are angled by an angle A1 relative to an axial direction of the tire, and wherein the angle A1 is 60 degrees.

3. The tire of claim 1, wherein the width WT1 is 2.0 times the value of the width WT2.

4. The tire of claim 1, wherein the width WT1 is between 1.5 and 2.5 times the value of the width WT2.

5. The tire of claim 1, wherein the radially inner portion of each outer section has a circumferential width WB1, and wherein the width WB1 is less than the width WT1.

6. The tire of claim 1, wherein the radially inner portion of the center section has a circumferential width WB2, and wherein the width WB2 is greater than the width WT2.

7. The tire of claim 1, wherein the radially inner portion of each outer section has a circumferential width WB1, wherein the radially inner portion of the center section has a circumferential width WB2, wherein the width WB1 is less than the width WB2, and wherein the width WB1 and the width WB2 are both less than the width WT1.

8. A tire comprising:
   a tread portion comprising at least one of a tread rib or a tread block,
   a sipe included in the tread rib or the tread block,
   wherein the sipe includes a center section located axially between opposing outer sections, and
   wherein the center section and each outer section include a radially outer portion and a radially inner portion,
   wherein the radially outer portion of each outer section has a circumferential width WT1,
   wherein the radially outer portion of the center section has a circumferential width WT2,
   wherein the circumferential width WT1 is greater than the circumferential width WT2, wherein the radially inner portion of each outer section has a circumferential width WB1 that is less than the width WT1, wherein the radially inner portion of the center section has a circumferential width WB2 that is greater than the width WT2, wherein the circumferential width WB1 is less than the circumferential width WB2, and wherein the width WB2 is less than the width WT1, and wherein the sipe center section has opposing key edges on its radially outer portion.

9. The tire of claim 8, wherein the opposing key edges are angled by an angle A1 relative to an axial direction of the tire, and wherein the angle A1 is 60 degrees.

10. The tire of claim 8, wherein the radially inner portion of each outer section includes an axially outer portion having a radial depth DB1E and an axially inner portion having a radial depth DB1I, and wherein the radial depth DB1E is less than the radial depth DB1I.

11. The tire of claim 8, wherein the width WT1 is 2.0 times the value of the width WT2.

12. A tire sipe blade comprising:

a center section located axially between opposing outer sections, wherein the center section and each outer section include a radially outer portion and a radially inner portion, wherein the radially outer portion of each outer section has a circumferential width WT1, wherein the radially outer portion of the center section has a circumferential width WT2, wherein the circumferential width WT1 is greater than the circumferential with WT2, wherein the radially inner portion of each outer section includes an axially outer portion having a radial depth DB1E and an axially inner portion having a radial depth DB1I, wherein the radial depth DB1E is less than the radial depth DB1I, and wherein the sipe blade center section has opposing key forming edges on its radially outer portion.

13. The tire of claim 12, wherein the opposing key forming edges are angled by an angle A1 relative to an axial direction, and wherein the angle A1 is 60 degrees.

14. The tire of claim 12, wherein the width WT1 is 2.0 times the value of the width WT2.

15. The tire of claim 12, wherein the radially inner portion of each outer section has a circumferential width WB1, and wherein the width WB1 is less than the width WT1.

16. The tire of claim 12, wherein the radially inner portion of the center section has a circumferential width WB2, and wherein the width WB2 is greater than the width WT2.

17. The tire of claim 12, wherein the radially inner portion of each outer section has a circumferential width WB1, wherein the radially inner portion of the center section has a circumferential width WB2, wherein the width WB1 is less than the width WB2, and wherein the width WB1 and the width WB2 are both less than the width WT1.

\* \* \* \* \*